Figure 1:
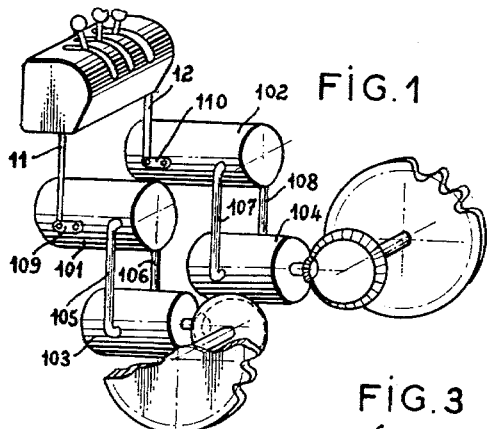

May 4, 1965

P. P. RICHARD 3,181,389

CONTROL MECHANISM

Filed Feb. 20, 1963

3 Sheets-Sheet 1

May 4, 1965 P. P. RICHARD 3,181,389
CONTROL MECHANISM
Filed Feb. 20, 1963 3 Sheets-Sheet 2
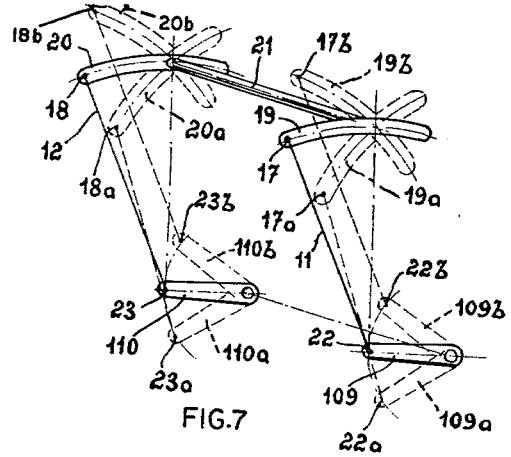
FIG.7
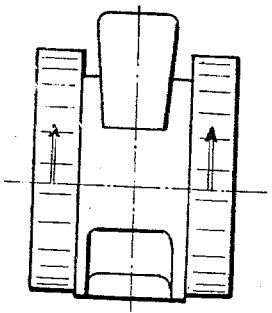
FIG.8
FIG.9
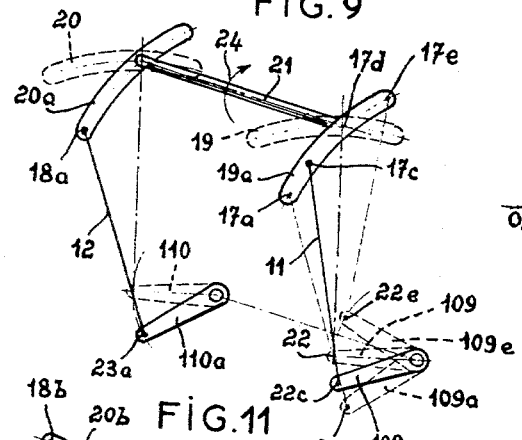
FIG.10
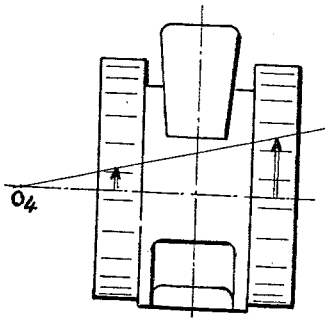
FIG.11
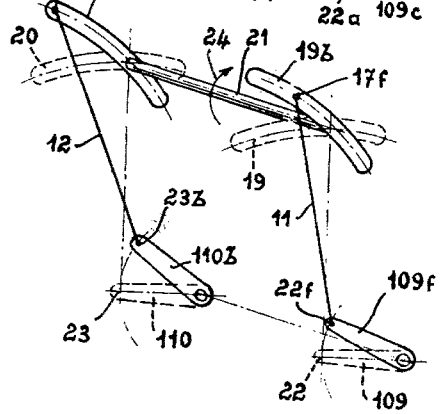
FIG.12
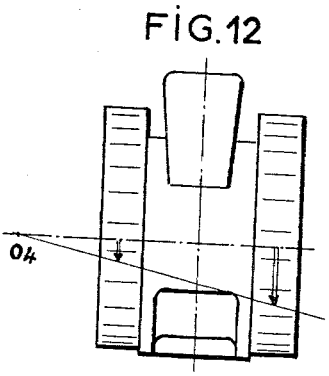

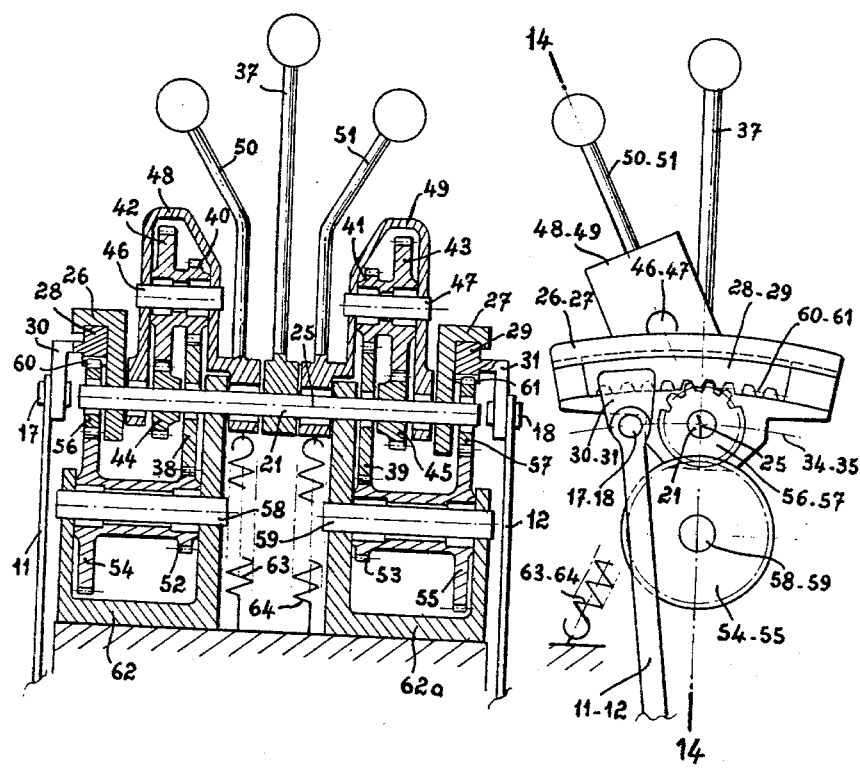

United States Patent Office 3,181,389
Patented May 4, 1965

3,181,389
CONTROL MECHANISM
Paul P. Richard, 10 Rue du Perou, Villeurbanne, France
Filed Feb. 20, 1963, Ser. No. 260,003
Claims priority, application France, Mar. 6, 1962,
42,360, Patent 1,327,759
2 Claims. (Cl. 74—480)

Tractors provided with self-laying tracks of the so-called caterpillar type and certain wheeled tractors which are steered through application of different speeds to the wheels located to either side of a vehicle, may be advantageously equipped with a double transmitting gear acting each independently on one of the self-laying tracks or of the wheels to one side of the tractor.

The two elementary transmitting gears may be of a mechanical, hydraulic, electric or any other suitable type. They may be controlled by a single supply of power, or else be provided each with their own supply of power. The features and advantages of such an embodiment consist in that it is possible on the one hand to control the speed and direction of progression of the vehicle through simultaneous actuation of the two transmitting gears and on the other hand to steer the vehicle through a differential action on the two gears in a manner such as to communicate different speeds to the wheels or self-laying tracks located on either side of the vehicle.

My invention relates to a control arrangement allowing selectively the control of the speed of the vehicle, of its direction of progression and of its path.

When the two transmitting gears are actuated by a common supply of power, the arrangement forming the object of my invention acts on the parts controlling the modifications in speed in the two transmitting gears. However if the two gears are provided each with its own supply of power, my improved arrangement acts either as in the preceding case on the parts controlling the modifications in speed in either gear, or else, it acts on the speed adjusting means of both supplies of power.

The control system according to my invention may be used in all cases where the modifications in speed in each of the two transmitting gears may be obtained in a continuous or substantially continuous manner, for instance, in the case where the mechanical transmitting gears are of the speed variator type or of the hydraulic transmission type including for each gear, a variable output pump feeding a hydraulic driving unit, or else, when regulators control the speed of two motors driving each through a suitable transmitting gear, the self-laying track or set of wheels on the corresponding side of the vehicle.

My improved arrangement includes to this end two arcuate slideways revolving in unison round an axis perpendicular to their planes and along which the ends of two connecting rods or parts carrying said ends are adapted to move, the length of said connecting rods being equal to the radii of curvature of the slideways while the other ends of the connecting rods are connected with the parts controlling the corresponding gears, the arrangement being such that it is possible to selectively make the slideway system turn without any modification in the relative position of the ends of the connecting rods with reference to the slideways or else to shift either or both ends of said connecting rods with reference to the corresponding slideways.

Figure 2:
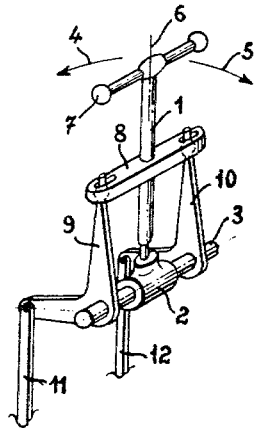
Figure 3:
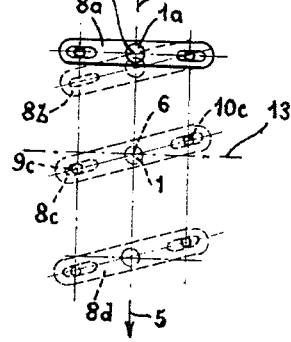
Figure 4:
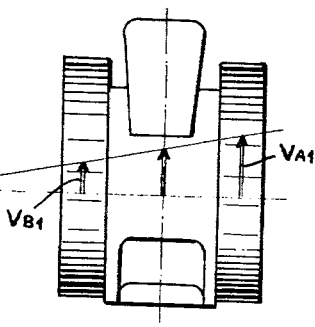
Figure 6:
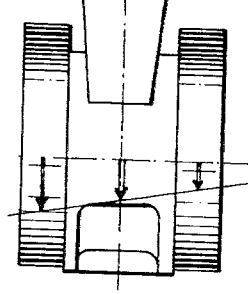
Figure 5:
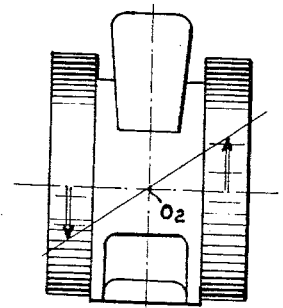

The accompanying drawings, given by way of example in association with the following description, will allow a better understanding of the nature of the problem solved by the invention and of the different means, provided herefor. In said drawings:

FIG. 1 is a general view of the arrangement showing the organization of a double transmitting gear of the hydraulic type for tractors, FIG. 2 is a diagrammatic showing of a simplified conventional control system which illustrates clearly the nature of the problem to be solved, FIG. 3 is a diagrammatic partial plan view of the same conventional system illustrating certain control possibilities of the steering of the vehicle, FIGS. 4, 5 and 6 show diagrammatically, for a track-laying tractor, the speeds of the self-laying tracks obtained by positioning the control means in the positions indicated in FIG. 3 and the corresponding steering angles.

FIG. 7 is a diagrammatic perspective view of the control arrangement which forms the object of my invention, FIG. 8 shows diagrammatically the speeds of the self-laying tracks of a tractor progressing along a straight line, FIG. 9 is a diagrammatic view, similar to FIG. 7, of the control arrangement according to my invention, in the case of a turn executed by the vehicle during forward progression, FIG. 10 illustrates diagrammatically in a manner similar to that of FIG. 8 a tractor turning during forward progression, as provided by the position of the control arrangement shown in FIG. 9, FIG. 11 is a diagrammatic view similar to FIGS. 7 and 9 relating to the case of the steering of the vehicle during rearward progression, FIG. 12 is similar to FIGS. 8 and 10 and illustrates diagrammatically a tractor in the case of a turn during rearward progression provided by the position of the control arrangement according to FIG. 11, FIG. 13 is a side elevational view of an embodiment given by way of a non limiting example, of a control arrangement according to my invention, some parts being omitted for sake of clarity, FIG. 14 is a sectional view, through line 14—14 of FIG. 13.

The following description relates to the case where the double transmitting gear is constituted by two hydraulic transmissions as illustrated in FIG. 1. In said figure, 101 and 102 designate two hydraulic pumps which are driven mechanically by a single engine which is not illustrated. The pump 101 feeds a hydraulic power unit 103 with fluid under pressure, through pipes 105 and 106. Similarly, the pump 102 feeds a hydraulic power unit 104 through the pipes 107 and 108. Each power unit drives mechanically the self-laying track or the lateral set of wheels on the corresponding side of the vehicle.

By acting on the levers 109 and 110, adjusting the output of said pumps 101 and 102 respectively, said output of the pumps varies, and therewith the speed of the hydraulic power units fed by said pumps. To each position of a lever 109 or 110, there corresponds thus a speed of rotation of the corresponding power unit 103 or 104 in a manner such that when said lever executes its complete stroke, the speed of the hydraulic power unit and consequently of the corresponding self-laying track or set of wheels varies between a maximum in one direction and a maximum in the opposite direction, through intermediate values, including zero which corresponds to a zero output of the pump.

Obviously any other transmission gear, the speed of which may vary in a substantially continuous manner, which gear may be of a mechanical or electrical type for instance, may be used instead of the hydraulic transmission just described, provided said gear supplies a sufficient range of speeds, controlled by the shifting of one or more control members which can be operated by the control arrangement which forms the object of my invention.

My invention may also be applied to the case where each of the self-laying tracks or each of the lateral sets of wheels is driven by an independent supply of power, for instance to the case where two engines drive respectively, through two suitable gears the corresponding self-laying tracks or lateral sets of wheels. In such a case, the levers such as 109 and 110 would serve for controlling the speed of the corresponding engines.

FIG. 2 illustrates, so as to allow a better understanding of the difficulties arising when steering a tractor provided with a double drive or transmission gear, a simplified control system which is not in conformity with the invention.

In said FIG. 2, a control lever 1 is pivotally carried at 2 in a manner such that said lever may be angularly shifted round a spindle 3 in the direction of the arrows 4 and 5 and also round its own axis 6. Said lever is provided with a control handle 7.

The lever 1 drives in its different movements a swing bar 8 controlling in its turn two bell cranks 9 and 10 fitted so as to revolve freely around the spindle 3 and driving the corresponding connecting rods 11 and 12 connected respectively with the levers 109 and 110 which regulate the output of the pumps 101 and 102 of FIG. 1.

If the operator acts on the lever 1 to make it turn around the spindle 3, without making it pivot around the axis 6, the swing bar 8 moves translationally in parallelism with itself and shifts the connecting rods 11 and 12 by equal amounts and in the same direction.

If the operator turns the handle 7 and lever 1 around the axis 6, the swing bar 8 revolves also around the axis 6 and carries along with it in its rotation, the ends of the levers 9 and 10, which produces an angular shifting in opposite directions of the rods 11 and 12.

The combination of the rotation of the lever 1 around the spindle 3 and of the rotation of the handle 7 around the axis 6 allows giving to rods 11 and 12 any desired relative position.

FIG. 3 shows the swing bar 8, as seen from above in plan view for various positions thereof.

The geometrical line 13 illustrates the medial position of the axis of the swing bar, for which the position of the rods 11 and 12, and consequently of the levers 109 and 110 controlling the output of the corresponding pumps corresponds to an output equal to zero for both pumps.

The position illustrated at 8a is that of the swing bar at one of the ends of its translational path without any rotation around its axis 6, which latter is shown now at 6a. When the swing bar has entered said position, the rods 11 and 12 have been angularly shifted by equal amounts and have brought the levers 109 and 110 controlling the output of the pumps into the position corresponding to maximum output and to forward progression of the vehicle. The two maximum outputs being equal, the vehicle will move in its direction of forward progression at maximum speed along a straight line, the equality between the outputs of the two pumps 101 and 102 providing equality of speed for the power units 103 and 104.

If the handle 7 is actuated in a manner such that the swing bar 8 rotates around the axis 6, and is brought from the position 8a to the position 8b, the output of the pump 101 is reduced, which output controlled by the lever 9 and connecting rod 11 corresponds to the left hand side self-laying track; consequently the speed of the left hand side self-laying track is reduced without this affecting the speed of the right hand side self-laying track. For the position 8b of the swing bar, the tractor is thus under the conditions shown in FIG. 4, the right and left hand side self-laying tracks assuming respectively the speeds VA1 and VB1, which speeds correspond to the steering of the tractor around a center of rotation O1 located on the left hand side of the tractor.

The speed of normal progression of the tractor is thus controlled by the translational movement of the swing bar 8 in the direction of the arrow 4 or of the arrow 5, while its steering is controlled by the rotation of the swing bar 8 around the vertical axis 6.

If it is desired to reduce the speed of progression when the swing bar is in the position 8b which corresponds to a steering of the tractor turning to the left under forward running conditions, the swing bar should be shifted in the direction of the arrow 5. If the angular position of the swing bar is not modified, in other words if the swing bar executes a translational movement, this reduces by equal amounts or at least substantially equal amounts, the speeds of both self-laying tracks, taking into account the small angular movements of the connecting rods, the difference of the speeds of said self-laying tracks being substantially constant.

For a position such as 8c of the swing bar, that is to say a position for which its center is located on the geometrical line 13 while the ends 9c and 10c of the levers occupy symmetrical positions with reference to said line, the outputs of the pumps 101 and 102 are equal but act in opposite directions, which means equal speeds in opposite directions for the power units. The tractor is thus subjected to the conditions shown in FIG. 5, the self-laying tracks moving in opposite directions, the center of the turn being now at O2. The tractor turns thus around its own axis.

A reduction in the speed of the tractor produced by the shifting of the lever 1 and therefore of swing bar 8 in the direction of the arrow 5, without modifying the angular setting of the handle 7 and of the swing bar 8 set in the position corresponding to a left handed turn for instance, is accompanied thus by a shifting of the center of rotation which is brought nearer the center of the tractor.

If the general direction of progression of the tractor is reversed by a further shifting of the lever 1, and consequently of the swing bar 8 in the direction of the arrow 5, without modifying the angular setting of the handle 7 and of the swing bar 8, until the latter occupies the position 8d for instance, the output of the pump 101 becomes higher in absolute value than that of the pump 102 which is reversed in its turn when the end of the lever 10 has moved beyond the line 13. The two self-laying tracks are thus both driven rearwardly, the speed of the left hand self-laying track being larger than that of the right hand track. Said condition is illustrated in FIG. 6, the speeds being illustrated by arrow vectors of proportional lengths.

The tractor moves now rearwardly as it turns around a center of rotation O3 located on the right hand side of the tractor as clearly shown in FIG. 6.

In other words, when the direction of progression of the tractor is reversed by acting on the lever 1 in the direction of the arrow 5, while the angular setting of the handle 7 and of the swing bar 8 remains unaltered, the center of turn is shifted from one side of the tractor to the other. The driver's reflex as to steering is reversed during rearward progression since for a same angular position of the handle 7 and according as to whether the vehicle is moving forwardly or rearwardly, the center of rotation of the tractor is loctaed on opposite sides of the tractor. The effect obtained is the reverse of that obtained with a conventional tractor for which a predetermined action on the steering wheel or lever corresponds to a steering around a center of rotation which is always the same and is independent of the speed and of the direction of progression of the tractor or more generally of the vehicle.

A steering system such as that which has just been described which reverses the driver's reflexes upon reversal of the direction of progression and even considerably modifies the turn radius when the speed of progression varies would lead to faulty operation and even to mishaps upon modification of the speed or direction of progression, chiefly if we take into account the fact that drivers on a building yard have to drive various machines of which some are equipped with conventional transmission gears responding to the driver's movements in the usual manner, whereas others would require different reflexes that is to say reflexes reversed for rearward movement.

The arrangement which forms the object of the present invention removes said drawback, while it ensures, in the case of a double transmitting gear, the possibility of driving with reflexes identical with those required by conventional driving means.

FIGS. 7, 9 and 11 illustrate diagrammatically the principle of operation of a driving system, acocrding to my invention.

With such an arrangement, the connecting rods 11 and 12 which control respectively the output adjusting levers 109 and 110 of the pumps have one of their ends, respectively 17 and 18, arranged so as to move each along an arcuate slideway, such as 19 for the connecting rod 11, and 20 for the connecting rod 12, whereas the other end of each of said connecting rods 11 and 12, that is to say respectively 22 and 23, is connected either directly as illustrated, or else through an intermediate linkage with a corresponding pump-controlling lever 109 or 110.

The lengths of the connecting rods 11 and 12 are equal to the radii of curvature of the slideways 19 and 20 which are positioned in parallel planes. Said two slideways 19 and 20 are rigidly secured to a rotary spindle 21 which is perpendicular to their planes.

Furthermore, the arrangement is such that, when the levers 109 and 110 controlling the output of pump are in a position for which the outputs of each pump is equal to zero, the ends 22 and 23 of the connecting rods 11 and 12 register with the centers of curvature of the slideways occupying the positions shown at 19 and 20 in FIG. 7. The result is that, as long as the slideways remain in the positions 19 and 20, the ends 17 and 18 of the connecting rods 11 and 12, the lengths of which are equal to the radii of curvature of the slideways, are allowed to move along said arcuate slideways without any shifting of the opposite ends 22 and 23.

In other words, the output of the two pumps will always remain equal to zero, whatever may be the positions of the ends 17 and 18 of the connecting rods 11 and 12 with reference to their respective slideways, as long as said slideways occupy the positions 19 and 20 for which their centers of curvature coincide with the positions 22 and 23 corresponding to a zero output.

If, now, the slideways 19 and 20 are angularly shifted with their common spindle 21 while the ends 17 and 18 of the connecting rods are left at the ends of the corresponding slideways, as illustrated in FIG. 7, the opposite ends 22 and 23 of the connecting rods are shifted and move the levers 109 and 110. The movements of said levers are equal when the ends 17 and 18 occupy corresponding positions on their sideways. For a position of the slideways such as 19a and 20a, the ends 22 and 23 of the connecting rods are at 22a and 23a and the two levers 109 and 110 occupy the positions 109a and 110a corresponding to equal and maximum outputs for the two pumps 101 and 102 under forward progression conditions so that the tractor will move forwardly at maximum speed, along a straight line, as illustrated in FIG. 8.

Similarly, for the positions of the slideways at 19b, 20b, the ends 22 and 23 of the connecting rods are at 22b and 23b and the levers 109 and 110 occupy the positions 109b and 110b which correspond to maximum and equal outputs of the two pumps under rearward progression conditions.

By making the shaft 21 turn so as to angularly shift the slideways 19 and 20 while leaving the ends 17 and 18 of the connecting rods 11 and 12 at the ends of the corresponding slideways, the output of the two pumps may thus be adjusted between maximum output in one direction and maximum output in the opposite direction through all intermediate values and in particular through zero output value for both pumps. When the spindle 21 is thus caused to turn, the outputs of both pumps remain equal; thus the speeds of both power units and of both self-laying tracks or of both wheels remain equal, and the tractor moves along a straight line at a speed and in a direction which is defined by the angular setting of the slideways.

The turning of the tractor is obtained by shifting the ends 17 or 18 of the connecting rods 11 and 12 along their slideways.

FIG. 9 illustrates diagrammatically the case of a turn during forward progression. In said figure, the slideways are shown in the positions 19a and 20a which correspond to full speed in forward direction. The connecting rod 12 controls the lever 110 controlling the output of the pump 102 feeding in its turn the power unit 104 driving the right-hand side self-laying track of the tractor. Similarly, the connecting rod 11 controls the drive which actuates the left-hand side self-laying track.

If now, without modifying the position of the slideways 19a and 20a, the end 17 of the connecting rod is shifted nearer the spindle 21 in a manner such as to bring it from 17a to 17c, the slideway remaining in its angular position 19a, the other end of the rod 11 moves nearer the position 22 corresponding to zero output and occupies the position 22c which moves the lever 109 into the position 109c, thus reducing the output of the pump 101 which controls the speed of the left hand side self-laying track. The speed of the left-hand side self-laying track decreases then with reference to that of the right hand side self-laying track and, as illustrated in FIG. 10, the tractor executes a steering around the center O4 to the left of the vehicle.

If, again without modifying the position of the sliders 19a and 20a, the end 17 of the rod 11 is brought into the position 17d, that is to say on the pivotal axis of the slideways, the other end of the rod occupies the position 22 which corresponds to a pump output which is equal to zero and consequently to a locking of the left-hand side self-laying track. If the end 17 of the rod 11 is brought into the position 17e, that is beyond the point of the slideway 19 registering with the spindle 21, the other end of the rod 11 occupies the position 22e and the lever 109 the position 109e corresponding to a reversed output of the pump, and consequently causes a rearward direction of progression for the left-hand side self-laying track, which means the turning center is located between the two self-laying tracks.

Leaving the end 18 of the rod 12 at 18a, while adjusting the position of the end 17 of the rod 11, along the slideway 19 which assumes a sloping position such as 19a, the output of the left-hand side pump may consequently be adjusted and thereby the speed of the left-hand side self-laying track may be adjusted to any value algebraically lower than that of the right-hand side self-laying track, which provides thus the left turn of the tractor around a predetermined center such as O4, as illustrated in FIG. 10.

Leaving now the ends 17a and 18a of the rods 11 and 12 in the positions occupied by them in the slideways, i.e. without modifying the spacing of said ends with reference to the spindle 21, the slideways 19 and 20 are caused to revolve in unison around said spindle 21 in the direction of the arrow 24, the opposite ends of the rods 11 and 12 are shifted, by amounts which are substantially proportional to the distances separating the ends 17c and 18a from the spindle 21. The lengths travelled over by the levers 109 and 110 are substantially proportional to said amounts, and consequently the respective outputs of the pumps 101 and 102 and consequently the speeds of the left and right hand sides of the self-laying tracks are reduced proportionally. The general speed of progression of the tractor is thus reduced, without any substantial modification in the position of the center of the turn as defined by the position 17c of the end of the rod 11. This novel feature of the arrangement is retained even when the direction of progression of the vehicle is reversed. As a matter of fact, if the system of slideways continues revolving in the direction of the arrow 24 so as to bring said sliders in the positions 19b and 20b extending beyond the positions 19 and 20 corresponding to zero output for both pumps, as illustrated in FIG. 11, the ends of the rods 11 and 12 retain their positions at 17f and 18b, and their opposite ends lie at 22f and 23b; the levers 109 and 110 occupy consequently the positions 109f and 110b which are located beyond the positions of the zero outputs 109 and 110 and both correspond to the rearward direction of the power units 103 and 104. Due to the fact that the pivotal point 18 is spaced further from the spindle 21 than the pivotal point 17, the shifting of the opposite end 23 of the connecting rod 12 is larger than the shifting of the end 22 of the connecting rod 11 and the output of the pump 102 is reversed and its value is higher in absolute value than that of the pump 101, which is also reversed. Consequently the two tracks move rearwardly, which implies that the tractor also moves rearwardly, but the right hand side of the track is shifted rearwardly faster than the left hand side track.

Proportionality, or at least substantial proportionality of the speeds is obtained, and the center of the turn will remain substantially stationary at O4 as illustrated in FIG. 12.

The reversal of the direction of progression and the modifications in speed, both obtained by angularly shifting the two slideways around the spindle 21 do not substantially shift the steering center of the vehicle, which center depends only on the relative positions of the ends 17 and 18 of the connecting rods 11 and 12 on the slideways 19 and 20.

It should be noted that by setting the slideways in their neutral positions 19 and 20, the tractor is stopped whatever may be the positions of the ends 17 and 18 on the slideways.

Proportionality of the movements of the levers 109 and 110 during the angular shifting of the slideways around the spindle 21 cannot be strictly obtained since the connecting rods and the levers extend in an oblique direction. However, a slight lack of proportionality does not modify substantially the behavior of the tractor, and said defect can be easily reduced by a sufficient extent by resorting to sufficiently long connecting rods, or by any other means.

In all cases, the driver's reflex movements required by my improved arrangement remain the same as in conventional arrangements since, for each of the positions of the steering means, there corresponds a predetermined center of rotation which at the most varies slightly, whatever movement is imparted to the means adjusting the speed or direction of progression.

FIGS. 13 and 14 illustrate, by way of non limiting examples, an embodiment of a control mechanism according to the invention.

In said figures 26 and 27 designate the arcuate slideways in the grooves of which may move two small arcuate sliders 28 and 29. The two arcuate slideways 26 and 27 are rigidly secured to and rotate in unison with the spindle 21. A lever 37 also rigidly secured to the spindle 21 allows driving in rotation the two slideways 26 and 27.

The two sliders 28 and 29 are provided with lugs 30 and 31 on which are fitted the pivotal ends 17 and 18 of the connecting rods 11 and 12 which control the corresponding levers 109 and 110 adjusting the output of the pumps.

The lugs 30 and 31 are formed in a manner such that the pivotal ends 17 and 18 of the connecting rods 11 and 12 describe, when the sliders move along the corresponding slideways, arcuate lines 34 and 35 concentric with reference to the slideways and crossing the geometrical axis 25 of the spindle 21. Obviously, the arcuate lines 34 and 35 play the same part as the slideways 19 and 20 illustrating the principle of the invention as disclosed with reference to FIGS. 7 to 12 and these arcuate lines are driven into rotation simultaneously around the axis 25 when the spindle 21 is rotated through actuation of the lever 37. The sliders 28 and 29 which are adapted to slide in the arcuate grooves of the slideways 26 and 27 are provided each with an inner series of teeth constituting the corresponding arcuate rack 60 or 61; these racks mesh respectively with pinions 56 and 57 carried in a loose manner by the spindle 21.

The pinions 56 and 57 mesh respectively with the toothed wheels 54 and 55 coaxially rigid with pinions 52 and 53 and fitted on the corresponding spindles 58 and 59 which are carried by the stationary frame 62a which carries also the shaft 21.

The pinions 52 and 53 mesh in their turn with the corresponding toothed wheels 38 and 39 which are fitted loose on the spindle 21. Said toothed wheels 38 and 39 mesh respectively with the pinions 40 and 41 which rotate in unison with the toothed wheels 42 and 43. The gears 40 and 42 on the one hand and 41 and 43 on the other hand are adapted to rotate around the corresponding stub shafts 46 and 47 which are carried respectively by frames 48 and 49 adapted to rotate in a free manner around the spindle 21 under the control of the levers 50 and 51.

The wheels 42 and 43 mesh respectively with the pinions 44 and 45 which are rigidly secured to the spindle 21 to rotate in unison therewith.

The number of teeth on the pinions in the series 44, 42, 40, 38, 52, 54 and 56 on the one hand, and 45, 43, 41, 39, 53, 55 and 57 on the other hand, is selected in a manner such that if the frames 48 and 49 are held against motion, the amounts of the angular shifting of the extreme pinions 44 and 56 on the one hand, and 45 and 57 on the other hand, in each series are equal and their direction is the same.

Consequently, when the lever 37 is actuated, the arcuate slideways 26 and 27 are angularly shifted together with the pinions 44 and 45 also rigidly secured to the shaft 21. The pinions 56 and 57 carried loose by the shaft 21 are driven through the corresponding kinematic chains, and the amounts of their angular shifting are the same as those of the pinions 44 and 45 and consequently of the slideways 26 and 27. No relative movement is therefore obtained for the pinions 56 and 57 with reference to the slideways 26 and 27, all of which parts revolve in unison; therefore no relative shifting of the sliders 28 and 29 is obtained wtih reference to the corresponding slideways, said sliders being held fast with reference to said slideways by reason of their annular racks 60 and 61 meshing with the pinions 56 and 57.

The distances separating the pivotal axes of the ends 17 and 18 of the connecting rods 11 and 12 from the geometrical axis 25 of the spindle 21 are thus unaltered when the lever 37 is actuated to rotate the sliders around the axis 25.

In contradistinction, if the lever 37 is held in a predetermined position and one of the lateral levers 50–51 is actuated, the corresponding frame, say the frame 48, is rotated with reference to the spindle 21 on which the frame is revolvably fitted.

In the epicyclic gear 44–42–40–38, the pinions 40 and 42 from the planet pinions revolvably carried by the frame 48. The pinion 44 is stationary with the shaft 21 and the lever 37, so that any angular shifting of the frame 48 produces a rotation of the sunwheel 38 around the spindle 21 on which it is loosely carried.

The ratio between the angular speed of the pinion 38 and the angular speed of the frame 48, and the relative direction of progression of said two parts are defined by the structure of the epicyclic gear formed by the pinions 44–42–40–38 and the number of teeth of the different pinions in accordance with the well known laws governing the operation of epicyclic gears.

The rotation of the pinion 38 produces that of the pinions 52 and 54 and consequently that of the pinion 56 around the spindle 21. Since the slideway 26 remains stationary with the spindle 21, and the pinion 56 revolves, the latter, by reason of its meshing with the rack 60 formed on the slider 28, produces a sliding of said slider along the groove in the slideway 26 and, consequently, a shifting of the end 17 of the connecting rod 11 along the arcuate line 34.

Similarly, actuation of the lever 51 produces a shifting of the end 18 of the connecting rod 12 along the arcuate line 35.

The mechanism which has just been described allows thus satisfying easily the conditions illustrated in FIGS. 7, 9 and 11; actuation of the lever 37 produces an angular movement of the slideways without any shifting of the pivotal ends of the connecting rods with reference to said slideways, whereas actuation of the lever 50 or 51, produces the shifting of said pivotal ends along their slideways.

The lever 37 allows consequently adjusting the speed of progression of the tractor or the direction of its progression without acting on its path of travel, whereas the lever 50 or 51 provides for modifications in said path and, consequently, ensures the steering of the tractor.

In the case where an automatic control system is used, for instance in cooperation with a thermic engine, operating under constant power conditions, said control system may be advantageously caused to act on the lever 37 and, thus, also on the two transmitting gears without modifying the rectilinear path followed by the vehicle. For instance, if, as a consequence of an increase in the resisting torque, the speed of the thermic engine has a tendency to fall, the control system acting on the lever 37 reduces the output of the two pumps 101 and 102 and, consequently, the speed of the engine and the demand of power from the thermic engine. As already disclosed, said action on the lever 37 reduces the speed without modifying the path defined by the positions given to the levers 50 and 51.

It may be advantageous, at least for certain applications, to give the sliders and consequently the ends 17, 18 of the rods 11, 12, paths of travel which are dissymetrical with reference to the point of the arcuate lines 34, 35 registering with the geometrical axis 25 of the spindle 21 with a view to limiting the speed of a track-laying means or of a set of wheels when reversed under the effect of the lever 50 or 51. As a matter of fact, reversal is normally obtained by rotating bodily the slideways through the agency of the lever 37. The shifting of one of the ends 17 or 18 beyond the point registering with the axis 25, serves only for bestowing one of the self-laying tracks with a movement in a direction opposed to that of the other self-laying track so as to turn the tractor around.

Other arrangements such as return springs such as 63 and 64 and the like may, of course, be made without modifying the scope and the nature of the present invention as defined in the accompanying claims.

What I claim is:

1. An arrangement for controlling the speed, direction of progression and steering of a vehicle, including carrier means on each side thereof and independent transmission gears for the drive of each carrier means, said arrangement comprising two parallel plates provided with arcuate slideways parallel to each other, a spindle rigid with both plates and extending perpendicular thereto, said spindle having an axis of rotation, a slider in each slideway, adapted to be shifted along said slideway, a pair of connecting rods each having one end pivotally connected with a corresponding slider, a pair of levers each being pivotally connected to the other of the ends of a corresponding connecting rod, and pivotally connected for movement around an axis parallel with said spindle to thereby adjust the speed of the corresponding transmission gear, means for shifting the spindle around its axis together with the slideway plates to control simultaneously the two levers to adjust simultaneously the speed of both transmission gears for rectilinear movement of the vehicle, and further means for controlling the position of each slider in its slideway to adjust selectively the speed of one transmission gear, said connecting rods each having a length such that pivotal movement of the rods with respect to said levers causes the rods at said ends where they are pivotally connected to the sliders to generate arcs passing through the axis of the spindle and lying parallel to the arcuate slideways.

2. An arrangement for controlling the speed, direction of progression and steering of a vehicle, including carrier means on each side thereof and independent transmission gears for the drive of each carrier means, said arrangement comprising two parallel plates provided with arcuate slideways parallel to each other and of equal radius and angular extent, a spindle rigid with both plates and extending perpendicular thereto and having an axis of rotation which is disposed outside the two slideways, a slider in each slideway, adapted to be shifted along said slideway, a pair of connecting rods each having one end pivotally connected with a corresponding slider, a pair of levers each being pivotally connected to the other of the ends of a corresponding connecting rod and pivotally connected for movement around an axis parallel with said spindle to thereby adjust the speed of the corresponding transmission gear, means for shifting the spindle around its axis together with the slideway plates to control simultaneously the two levers to adjust simultaneously the speed of both transmission gears for rectilinear movement of the vehicle, and further means for controlling the position of each slider in its slideway to adjust selectively the speed of one transmission gear, said connecting rods having a length such that pivotal movement of the rods with respect to said levers causes the rods at said ends where they are pivotally connected to the sliders to generate arcs passing through the axis of the spindle and lying parallel to the arcuate slideways.

References Cited by the Examiner
UNITED STATES PATENTS
621,193  3/99  Wilson _____ 74—471

BROUGHTON G. DURHAM, *Primary Examiner.*

MILTON KAUFMAN, *Examiner.*